Dec. 28, 1937.  W. E. URSCHEL  2,103,306
CULTIVATING AND WEEDING DEVICE
Filed Jan. 22, 1934  3 Sheets-Sheet 1

INVENTOR.
William E. Urschel
BY
ATTORNEY.

Dec. 28, 1937.  W. E. URSCHEL  2,103,306
CULTIVATING AND WEEDING DEVICE
Filed Jan. 22, 1934   3 Sheets-Sheet 2

INVENTOR.
William E. Urschel
BY
ATTORNEY.

Dec. 28, 1937.  W. E. URSCHEL  2,103,306

CULTIVATING AND WEEDING DEVICE

Filed Jan. 22, 1934   3 Sheets-Sheet 3

INVENTOR.
William E. Urschel
BY
ATTORNEY.

Patented Dec. 28, 1937

2,103,306

UNITED STATES PATENT OFFICE 2,103,306

CULTIVATING AND WEEDING DEVICE

William E. Urschel, Valparaiso, Ind.

Application January 22, 1934, Serial No. 707,664

25 Claims. (Cl. 97—21)

This invention relates to a cultivating and weeding machine.

In a conventional cultivator, plows pass along rows of a crop leaving uncultivated spaces between the individual plants in each row. The space between plants in each row is cultivated usually by hand labor. A hoe may be employed to kill any weed growing between such plants in any single row and also to thin out plants in such row when required.

One of the objects of the present invention is the provision of a device which will cultivate between the rows of a crop and also cultivate between the individual plants in a row of the crop.

Another object of the present invention is the provision of a power driven cultivator which will exterminate the weeds in a row of a crop as the space at each side of such row of the crop is cultivated.

These objects, and such other objects as may hereinafter appear, are obtained by the novel construction, unique arrangement and improved combination of parts in the single embodiment of the invention illustrated in the attached three sheets of drawings, hereby made a part of this application, and in which.

Like reference characters are used to designate similar parts in the drawings and in the following description of the illustrated machine.

Figure 1:
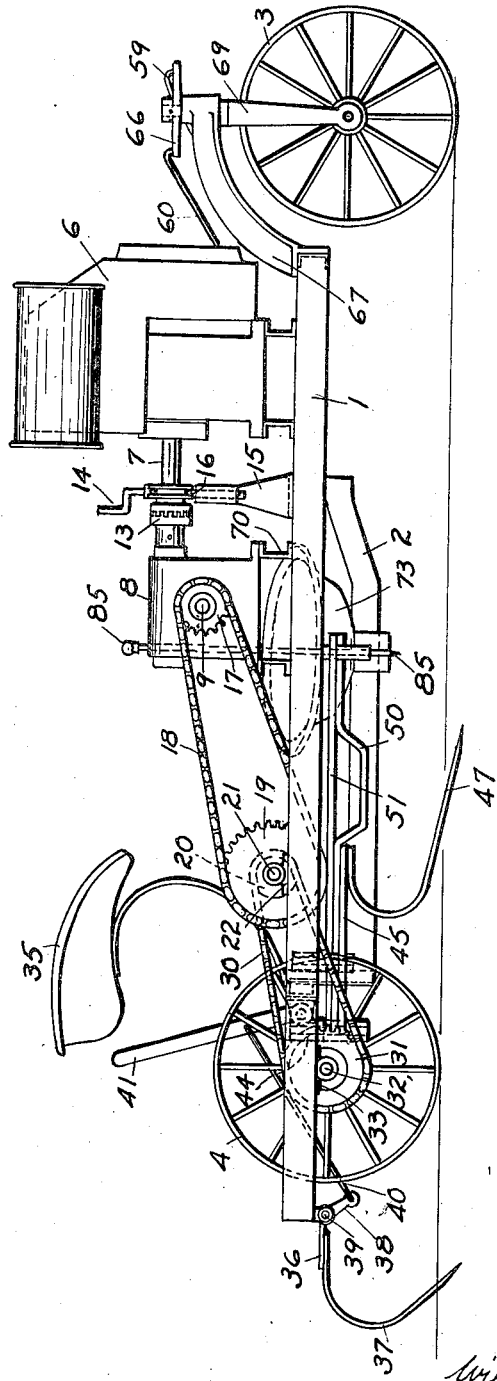
Figure 1 is a side elevation of one form of a machine embodying the subject matter of the present invention.

The device in general comprises a frame or support adapted to be propelled over the ground with relation to a row of plants and in the direction preferably substantially parallel to the row of plants and in such manner that the cultivating means carried by the support travels substantially along the longitudinal axis of the row of plants. The machine has a frame which consists of three longitudinal frame members 1 joined by end frame members 93 and 94 (see Figures 1, 2 and 3). The frame is supported at its rear end by two wheels 4 which are rotated with a driven shaft 32. Shaft 32 is journaled in bearings 33 upon frame members 1.

The front end of the frame is supported by a single wheel 3 freely rotating in a steering fork 69. The fork 69 is axially rotatable in a frame extension member which is secured to the front transverse frame member 93.

At the front of the machine between main frame members 1 is a conventional internal combustion engine 6 which is the prime mover for the machine. Said engine drives a shaft 7 that is coupled through clutch 13 to a worm shaft 12 journaled in a gear box 8. Clutch 13, which controls the movement of the machine, is thrown into and out of engagement by a hand lever 14 arranged in a convenient position for the driver's use. A worm 11, secured to shaft 12, drives a worm gear 10 that is mounted on a shaft 9. Shaft 9 projects from the gear box 8 and is journaled in said gear box.

A sprocket 17 secured to the projecting section of said shaft 9 drives a chain 18. A sprocket 19 secured to a counter-shaft 21 is driven by chain 18. Shaft 21 is journaled in bearings 22 which are bolted to the main frame members 1.

A sprocket 20 that is secured intermediate the ends of shaft 21 drives a chain 30. A sprocket 31 driven by chain 30 is secured to driven shaft 32 and rotates said shaft and the wheels 4 keyed thereto to motivate the machine.

The machine is guided by the wheel 3 journaled in fork 69 by the use of foot pedals 55 and 65. These are manipulated while the operator occupies seat 35. The pedal 65 is on the right side (Figure 2) and is secured to one end of a rod 63 which is slidingly disposed in a bracket-like support 64. Rod 63 is attached at its other end to a bell crank 61. Bell crank 61 is connected to a steering arm 66 by a rod 60. The bell crank 61 is pivoted in a bracket 62 attached to intermediate frame member 1. Arm 66 is securely fastened to the steering fork 69.

On the opposite or left side (Figure 2) pedal 55 is secured at one end of a rod 57 that is secured at its other end to a bell crank 58. The rod 57 is slidingly supported in a bracket 56 upon frame member 93. A rod 59 connects bell crank 58 and arm 66. By pushing on one foot pedal or the other, the operator is able to accurately direct the machine down a row of a crop.

Figure 2:
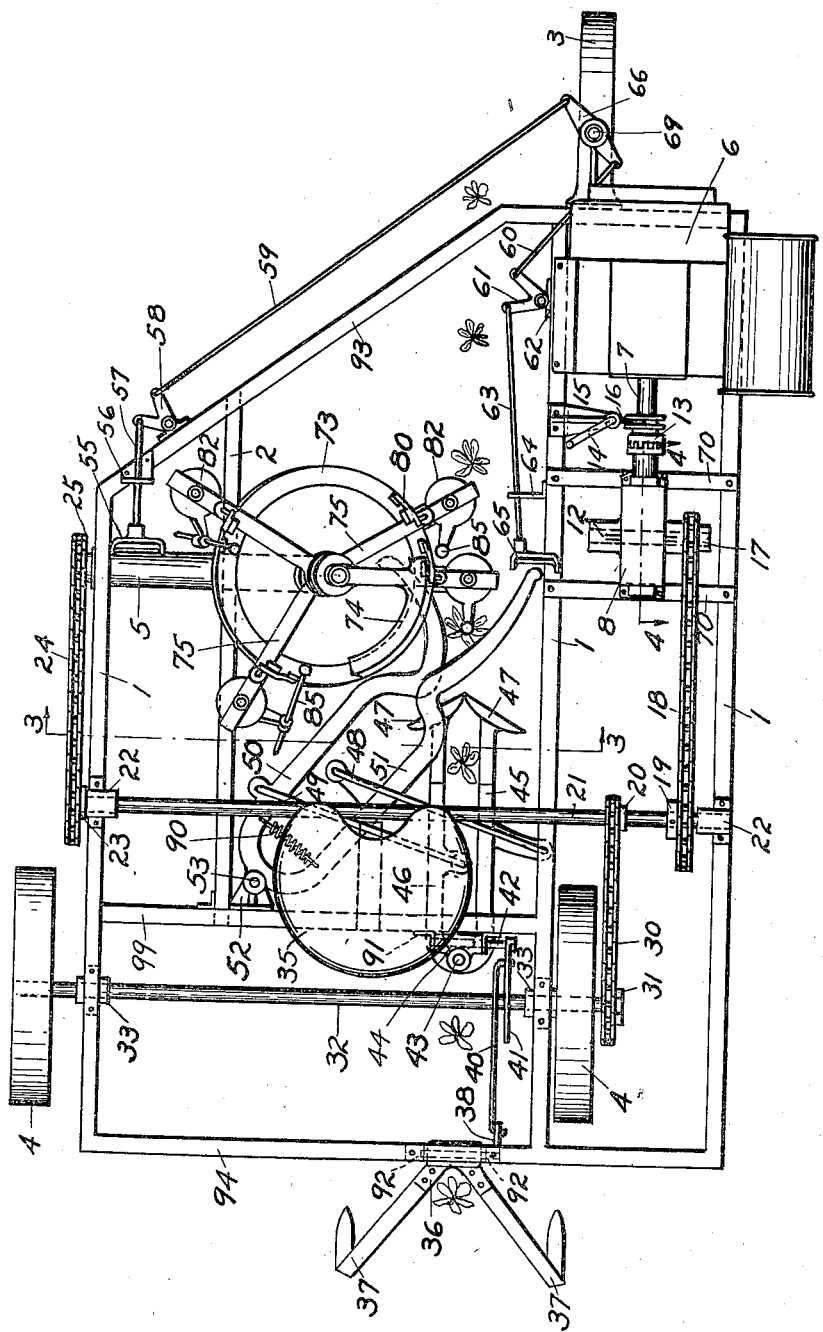
Figure 2 is a plan view of the machine shown in Figure 1.
Figure 3:
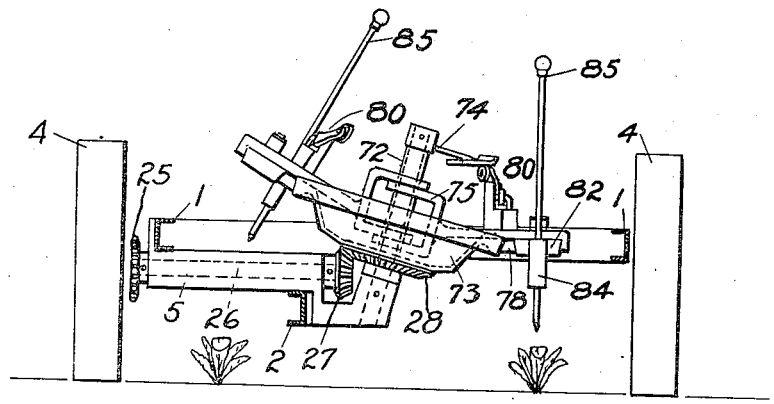
Figure 3 is a transverse section taken substantially on the line 3—3 of Figure 2.
Figure 5:
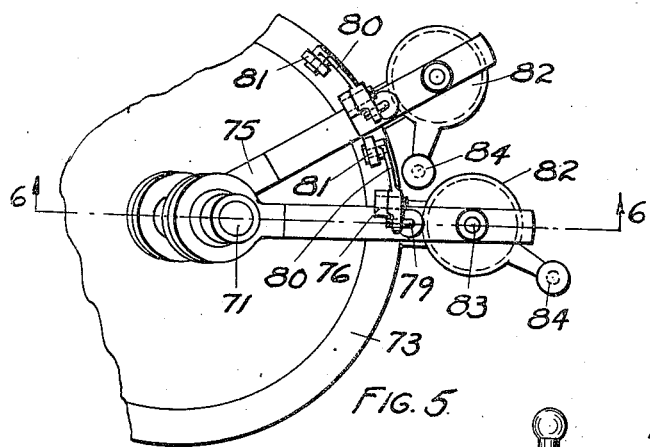
Figure 5 is a fragmentary plan view of the bowl and pointer arms forming a part of the device illustrated in the preceding figures.
Figure 4:
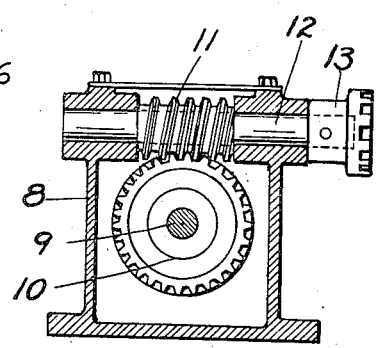
Figure 4 is a cross-section of the drive housing of the machine illustrated in Figure 1 taken on the line 4—4 of Figure 2.
Figure 6:
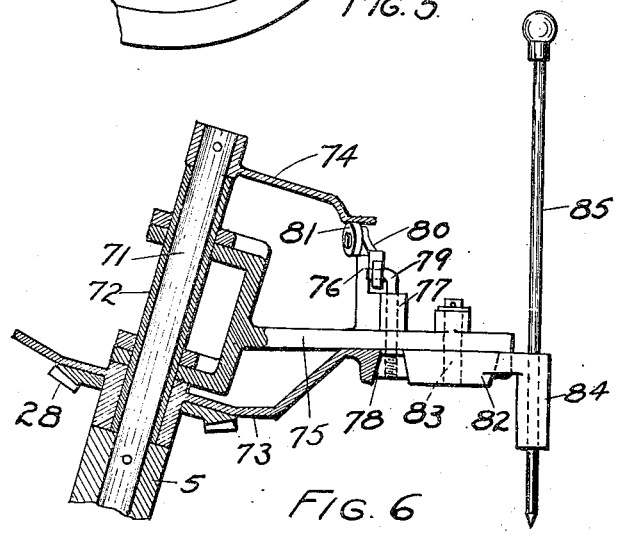
Figure 6 is a transverse section of the bowl taken on line 6—6 of Figure 5.

A power driven clutch member preferably specifically constructed as a bowl 73 which intermittently and selectively mechanically moves manually adjustable means specifically constructed as pointer arms 75 is mounted on a stub shaft 71 that is secured in a drive bracket 5. Bowl 73 is rotated during all forward movement of the machine by a gear 28 secured thereto and which is driven by a bevel gear 27. Bevel gear 27 is securely fastened to one end of a shaft 26 that is journaled in drive bracket 5. Sprocket 25, which is fixed to the other end of shaft 26, is driven by a chain 24 rotating about sprocket 23 on the left hand end of counter-shaft 21 (Figure 2). Thus a definite speed relation is established between the rotation of the bowl and the forward speed of the machine.

On a sleeve 72 which is about shaft 71 a number of indicator or pointer arms 75 are mounted for free rotation. Four of these arms are shown in the drawings. More of such arms may be used. On that part of the indicator arms 75 extending beyond the periphery of the bowl 73 are pointer levers 84 which swing about a stud 83 in said arm 75. In each of these levers is a pointer 85.

Locking rocker arms 80 are pivoted on projection 76 extending upwardly from each of arms 75. Idlers 81 are mounted on the long ends of rocker arms 80 and are placed to bear against a locking slide 74, which is secured to the nonrotating shaft 71, when the pointer arms 75 are to be locked in position relative to the rotating bowl 73.

Rods 79 are mounted pivotally in the short ends of the locking rocker arms 80 and extend downward through sleeves 77 and through holes provided in arms 75. A locking wedge 78 is secured to the lower end of rod 79 so that when the long end of the locking arm 80 is depressed by the locking slide 74 the locking wedge is pulled upwardly between the opposed faces of the levers 84 and the periphery of the bowl 73, to lock the several parts rigidly together. As a result the levers 84 and pointers 85 are locked to the rotating bowl and move with it.

A plow guide upon the machine comprises arms 50 and 51 pivoted on a stud 53 forming a part of a bracket 52. Said arms 50 and 51 may be spread apart. Bracket 52 is bolted to a transverse frame crosspiece 99. A tension spring 90 attached to plow guide members 50 and 51 urges said members together except when one of the pointers 85 passes therebetween to spread said arms or members apart.

The plow in the present device consists of two beams 45 and 46 which pivot about a pin 43 on a bracket 44 on transverse frame member 99. Each of said beams 45 and 46 supports a plow point 47. Said plow points 47 come together at the center of a row under cultivation as is shown in Figure 2. A rod 49 extends between and is pivoted in plow guide 50 and in plow beam 46. A second rod 48 extends between and is pivoted in plow guide 51 and in plow beam 45.

With this arrangement of parts, the plow points 47 are caused to follow the movements of the plow guide members 50 and 51. Plow points 47 are used to cultivate between plants in a row of a crop under cultivation.

A cross pin 42 is secured in plow bracket 44 and passes through two plates 91 which are secured to said cross member 99. A lever 41 is keyed to cross pin 42 and extends upwardly to a position convenient to operator's seat 35. By means of the lever 41, the plow points 47 may be lowered or raised at the will of the operator.

Mounted at the rear of the machine are two conventional plows 37 for cultivating the space between the rows, or at each side of a row under cultivation. Plows 37 are secured to a hinge casting 36 in which is fastened a pin 39. The pin 39 passes through a plate 92 which is mounted on cross frame member 94 on each side of the hinge casting 36. A lever 38 is fastened to pin 39 and is joined to the plow control lever 41 by a rod 40. By this arrangement, the rear plows are raised and lowered by the same lever that is used to control the vertical position of the plow points 47.

It will thus be seen that the machine frame or support which is adapted to travel over the ground is provided with power driven means, preferably actuated by the movement of the support over the ground and in proportion to the rate of travel of the support over the ground, for mechanically actuating the cultivating means or plows 47. This power driven means in the preferred embodiment manifestly comprises the power driven bowl 73 which, in the present instance, takes the embodiment of one portion of a mechanically driven or power driven clutch mechanism rotating in synchronism with and in proportion to the travel of the vehicle over the ground, together with the shiftable clutch mechanism 78, and the manually adjustable pointer arm 82 which, in the present instance, comprises one or more of a plurality of adjustable control means of the cooperative clutch mechanism whereby the manually operable means or adjustable control means may be shifted through a range of different adjustments to be positioned substantially directly over the locus or position in the ground of the particular plant, while the support is travelling over the ground, and whereby on movement of said part 82 in a rearward direction, through the instrumentality of the locking slide 74, is automatically clutched to the arm 75 so that the power mechanism will then move the arm 75 and the manually operable means in a direction to engage the arms 50 and 51 comprising a part of the means for power shifting the plows or cultivators 47 to a position to avoid the particular plant over which the portion 85 of the manually operable means was positioned.

In addition, it will be readily understood that, due to the rotatable and adjustable mounting of the member 82 about the pin 83, the arm 85 of the manually operable means may be swung to any desired position of adjustment with relation to the longitudinal axis of the row of plants, that is, to a position such that the member 85 will be directly over a plant in the longitudinal row or directly over a plant laterally thereof. Due to the adjustment of this position of the portion 85 and to the further fact that it is locked in said adjustable position and in such position is power driven to engage the arms 50 and 51 of the cultivator shifting mechanism, through the linkage connecting the arms 50 and 51 with the cultivators 47, the cultivators will likewise be shifted laterally of the longitudinal axis of the row of plants to correspond with the adjusted position of the member 85 so that in the further power driven movement of the member 85 it will engage the arms 50 and 51 in their newly shifted position, will automatically spread them to cause the lateral movement of the plows 47 and whereupon they will be automatically returned to their original position after they have so avoided the plant.

It will thus be seen that by means of the pivotal mounting 83, the member 85 is adjustable to vary the extent of the shifting movement of the cultivating means and therefore comprises adjustable control means for producing an adjustable variable relative transverse movement of the cultivating means. It will also be seen that by adjusting the manually adjustable control means directly over the locus of a particular plant, such positioning of the member accompanied by its power driven movement, in proportion to the rate of travel of the vehicle over the ground, will automatically and mechanically cause the actuation of the plows not only adjustably to shift them to a selected new position of adjustment, but will also cause their automatic to and fro movement to avoid the particular plant during the movement of the vehicle over the ground.

In the operation of the machine, the operator occupies seat 35. After starting the machine forward, the operator, by means of the foot pedals 65 and 55, steers the machine down a row of the crop. The bowl 73 concurrently is driven at such a speed that its periphery travels around at the exact speed of the machine as it travels over the ground. As the machine travels down a row of a crop, the operator grasps a pointer 85 at the front of the bowl where it is freely movable and aims such pointer directly over a plant not to be struck by plow points 47 or cut away. As the pointer 85 is fastened in the movable arm 84, said pointer may be swung sideways of a row to aline pointer 85 with the axis of plants which are not directly in the center of the row.

After the pointer 85 is aimed directly over a plant, the operator draws the pointer 85 rearwardly a slight distance always keeping the pointer directly over the selected plants. As the indicator arm 75 moves rearwardly under the urge and guidance of the operator holding pointer 85, the locker arm 80 on pointer arm 75 is depressed by engagement of roller 81 upon the locking slide 74.

Such engagement draws the locking wedge 78 upwardly and securely locks the moving bowl 73, the arm 75 which the operator has been manipulating, and the lever 84 together. The power driven bowl then carries such arm 75 therearound. As the pointer and bowl move rearwardly, the pointer, moving radially of the bowl, the pointer 85 engages one or the other of the curved guides 50 and 51 at the front end thereof and this guides the two plow points 47 until the pointer is centered between the guides. The centering manipulations of the parts 50 and 51 are transmitted to the plow points 47 by means of rods 48 and 49. Such motion causes the plow points to move selectively in relation to the plant aimed at by the operator. As the pointer 85 continues to move around the bowl, the pointer forces itself between the plow guides 50 and 51 and spreads them apart due to the fact that said guides overlap as is shown in Figure 2.

Because the plow guides are connected to the plow beams by rods 48 and 49, the plow points 47 also will be forced apart and the plow point 47 clear the selected plant at its sides. After the plow points have passed the plant, the pointer because it is moving with bowl 73 passes from between the plow guides 50 and 51 whereupon spring 90 draws the plow points 47 together again. At this time the roller 81 disengages guide 74 releasing the pointer arm 75 from engagement with bowl 73 whereupon the pointer 85 on the arm, in its proper turn, becomes fully manually adjustable. It will thus be seen that I have provided adjustable means mounted on the support in advance of the position of the cultivating plows 47, which adjustable means comprises the arm 75, a block 82 pivoted around the axis 83, the sleeve 84 and the rod 85, and I have provided further instrumentalities operated by the actuation of this adjustable means for automatically causing the power means to shift the cultivating means to any one of a plurality of positions. These instrumentalities include the rotating bowl 73, the wedge 78, and its actuating mechanism, including the roll 81 and the locking slide or plate 74, which upon manual actuation of the member 85 will cause the power means to shift the cultivating means 47 and this is done by reason of the member 85 striking other portions 50 and 51 of these instrumentalities for actuating the linkage 48 to shift the arms 45 and 46 carrying the cultivating members 47.

As the machine travels down a row of the crop, this same cycle of operations is repeated for each plant to remain in a row. The operator selects, by means of the pointer 85, the plants that he desires to be cultivated. As soon as the plow points 47 approach the plants so selected, the points are spread apart to pass harmlessly around the plant and to come together again as soon as they are beyond the plant. By this means the ground between the plants in a row of a crop may be cultivated and any weeds exterminated concurrently with the cultivation of the ground at each side of the row.

What is claimed as new and is desired to be secured by Letters Patent of the United States is:

1. A cultivator comprising transversely movable plows, means for advancing said plows along a row of plants to be cultivated, a pointer manually movable to point to a plant in the path of said plows, and mechanical means in cooperation with said pointer and controlled thereby to move said plows to avoid such plant.

2. A cultivator comprising adjacent separable plows, means for advancing said plows along a row of plants to be cultivated, a pointer manually movable to point to a plant in the path of said plows, and mechanical means in cooperation with and controlled by said pointer to separate said plows to avoid such plant.

3. In a cultivator, a pair of movable plows, mounting means allowing movement of said plows transversely of said cultivator and from adjacent to separated positions, a pointer manually movable to point to an area not to be traversed by the plows, and mechanical means in cooperation with and controlled by said pointer to move said plows transversely into line with said area and to separate said plows to pass on each side of such area.

4. In a cultivator, a pair of adjacent movable plows, a pointer manually movable to point to a plant to be avoided by said plows, mechanical means for moving said pointer after it is manually pointed, and means actuated by said pointer when it is mechanically moved for moving said plows transversely and from and to adjacent positions to avoid such plant.

5. In a cultivator, a pair of movable plows, a pointer manually movable to point to a plant to be avoided by said plows, mechanical means for moving said pointer, means for locking said pointer to said pointer moving means after said pointer is manually pointed, and means controlled by said pointer when locked to said moving means for moving said plows transversely and to and from adjacent positions to avoid such plant.

6. A cultivator comprising means for advancing said cultivator along a row of plants to be cultivated, a pair of movable plows, mounting means on said cultivator for said plows allowing a joint transverse movement of said plows and movement thereof transversely to and from adjacent positions, a pointer manually movable to point to a plant in said row, mechanical means for moving said pointer rearwardly of said cultivator to maintain said pointer substantially stationary in relation to the ground as said cultivator advances, means for locking said pointer to said pointer moving means, and means actuated by said pointer when locked to said pointer moving means for moving said plows transversely into line with such plant and moving them out of adjacent positions to avoid the plant pointed to by said pointer.

7. A cultivator comprising adjacent separable plows, means for advancing said plows along a row of plants to be cultivated, a pointer manually movable to point to a plant in the path of said plows, mechanical means for maintaining said pointer stationary with respect to the plant to which it is manually pointed as the plows advance, and means in cooperation with and controlled by said pointer when maintained over said plants to separate said plows to avoid such plant.

8. A cultivator comprising a transversely movable plow, means for advancing said plow along a row of plants to be cultivated, a pointer ahead of said plow and manually movable to positions over areas to be avoided by said plow, and mechanical means in cooperation with and controlled by said pointer for moving said plow to avoid said areas.

9. A cultivator comprising a frame, means for advancing said frame along a row of plants to be cultivated, paired plows, means for mounting said plows on said frame for transverse conjoint movement and for concurrent transverse movements to and from adjacent positions, a pointer for indicating plants to be spared by said plows, mechanical means on said frame adapted to cooperate with said pointer to move it rearwardly at a speed substantially equal to the forward speed of the plows, and means for locking said pointer to said mechanical moving means, said pointer when locked to said moving means actuating said mounting means to guide said plows toward and then about a selected plant.

10. A cultivator comprising a frame, means for moving said frame forwardly along a row of plants to be cultivated, a cultivator tool, a pointer on said frame, manually movable when in an advanced position to point to said plants, mechanical pointer moving means, locking means to lock said pointer to said pointer moving means when said pointer is moved rearwardly from said advanced position, and tool moving means actuated by said pointer when locked to said pointer moving means.

11. A cultivator comprising a transversely movable cultivator tool, means for advancing said tool along a row of plants to be cultivated, a pointer, mechanical pointer moving means, means for locking said pointer to said pointer moving means, means for operating said locking means by a selected movement of said pointer, and means actuated by said pointer when locked to said pointer moving means to move said tool transversely.

12. A cultivator comprising a support adapted to travel over the ground in a predetermined direction, cultivating means shiftably mounted on said support for movement laterally with respect to the direction of travel of said support, power operated means for so moving said cultivating means, and adjustable means mounted on said support in advance of the position of said cultivating means thereon and mechanism operated by the actuation of said adjustable means for causing said power means to shift said cultivating means to any one of a plurality of positions laterally whereby to cause said cultivating means to move forwardly with said travelling support in one of a plurality of selected various parallel paths relative and parallel to the path of movement of said support, said mechanism including means for automatically and momentarily causing said cultivating means to shift laterally of said new path of travel and thence backwardly into said new path of travel.

13. A cultivator comprising a support adapted to travel over the ground and over a plant located in the ground, cultivating means shiftably mounted on said support, means for propelling said support to cause the same to travel over said plant and to cause the cultivating means to approach said plant as the support travels, adjustable means shiftably mounted on said support in advance of the cultivating means and adapted to be positioned so as to travel over the plant, and means actuated by the said positioning of said adjustable means to shift the cultivating means away from its former position on said support.

14. A cultivator comprising a support adapted to travel over the ground and over a plant located in the ground, a plurality of cultivating means shiftably mounted on said support, means for propelling said support to cause the same to travel over said plant and to cause the cultivating means to approach said plant as the support travels and in a path of travel parallel to a line passing through the locus of the plant, adjustable means shiftably mounted on said support in advance of the cultivating means and adapted to be positioned so as to travel over the plant, and means actuated by the said positioning of said adjustable means to shift the cultivating means laterally into the path passing through the locus of said plant.

15. A cultivator comprising a support adapted to travel over the ground and over a plant located in the ground, a plurality of cultivating means shiftably mounted on said support, means for propelling said support to cause the same to travel over said plant and to cause the cultivating means to approach said plant as the support travels and in a path of travel parallel to a line passing through the locus of the plant, adjustable means shiftably mounted on said support in advance of the cultivating means and adapted to be positioned so as to travel over the plant, and means automatically actuated by the said positioning of said adjustable means to shift the cultivating means laterally into the path passing through the locus of said plant and to separate said cultivating means as they travel along the new path of travel and as they approach said plant whereby to avoid the same.

16. A cultivator comprising a support adapted to travel over the ground and over a plant located in the ground, a plurality of cultivating means shiftably mounted on said support, means for propelling said support to cause the same to travel over said plant and to cause the cultivating means to approach said plant as the support travels and in a path of travel parallel to a line passing through the locus of the plant, adjustable means shiftably mounted on said support in advance of the cultivating means and adapted to be positioned so as to travel over the plant, and means automatically actuated by the said positioning of said adjustable means to automatically shift the cultivating means laterally into the path passing through the locus of said plant and to separate said cultivating means as they travel along the new path of travel and as they approach said plant whereby to avoid the same, and means to cause said cultivating means to approach each other relatively after said separating movement.

17. A cultivator comprising a support adapted to travel in a desired direction over the ground, cultivating means shiftably mounted thereon, means for shifting the cultivating means relatively to said support, and a plurality of adjustable control means shiftably mounted on said support and each adapted to be adjustably shifted to a predetermined position adjacent a particular plant in the ground as the support moves thereover, and means connecting each of said adjustable means to said cultivator shifting means including devices for causing the shifting of said cultivating means into predetermined position relative to each plant adjacent to which a control means has been shifted.

18. A cultivator comprising a support adapted to travel in a predetermined direction over the ground relative to plants in the ground, cultivating means shiftably mounted on said support throughout a range of different adjustments, control means adjustably mounted on said support and adapted to be shifted throughout a range of different adjustments, and means actuated by said control means when shifted to any one of said different adjustments for correspondingly shifting the cultivating means.

19. A cultivator comprising a support adapted to travel in a predetermined direction over the ground relative to plants in the ground, cultivating means shiftably mounted on said support throughout a range of different adjustments, a plurality of control devices adjustably mounted on said support and each adapted to be shifted throughout a range of different adjustments and means automatically actuated by said control means for correspondingly shifting the cultivating means.

20. A cultivator comprising a support adapted to travel over the ground in a direction substantially parallel to and substantially over a row of plants to be cultivated, a cultivating device shiftably mounted on said support, mechanism for shifting the cultivating device relatively to the support and the ground, manually operable means disposed on said support in advance of the cultivating device and adapted to be positioned substantially directly over a particular plant in the ground while said support is travelling over the ground, and means actuated by said manually operable means for causing said mechanism to shift said cultivating device to a position to avoid the particular plant over which the manually operable means was so positioned.

21. A cultivator comprising a support adapted to travel over the ground in a direction substantially parallel to and substantially over a row of plants to be cultivated, a cultivating device shiftably mounted on said support, power actuated mechanism for shifting the cultivating means relatively to the support, means for operating the power actuated mechanism in proportion to the rate of travel of the support over the ground, manually operable means disposed on said support and adapted to be positioned substantially directly over a particular plant in the ground while said support is travelling over the ground, and means actuated by said manually operable means for causing said mechanism to shift said cultivating device to a position to avoid the particular plant over which the manually operable means was so positioned.

22. A cultivator comprising a support adapted to travel over the ground in a direction substantially parallel to and substantially over a row of plants to be cultivated, a cultivating device adjustably mounted on said support, mechanism for shifting the cultivating device relatively to the support, a plurality of manually operable means disposed on said support and adapted to be positioned substantially directly over a particular plant on the ground while said support is travelling over the ground, and means actuatable by each of said manually operable means for causing said mechanism to shift said cultivating device to a selected position of adjustment to avoid the particular plant over which the particular one of said plurality of manually operable means is positioned.

23. A cultivator comprising a support adapted to travel over the ground in a predetermined direction, cultivating means shiftably mounted on said support for movement laterally with respect to the direction of travel of said support, power-operated means for so moving said cultivating means, adjustable means mounted on said support in advance of the position of said cultivating means on said support, means operated by the actuation of said adjustable means for causing said power-operated means to shift said cultivating means into any one of a plurality of positions laterally whereby said cultivating means moves forwardly with said traveling support in one of a plurality of selected paths extending parallel to the path of movement of said support, and in said laterally shifted position to shift automatically laterally of said selected path of travel and thence to shift backwardly into said selected path of travel.

24. A cultivator comprising a support adapted to travel over the ground along a pre-selected path of travel and over plants to be cultivated, cultivating means shiftable on said support substantially transversely of such direction of travel of said support, manually shiftable means on said support adapted to be shifted into various positions including those transversely of the path of travel of the support, power means actuated by movement of said manually shiftable means to cause the shifting of said cultivating means transversely of and relatively to said support whereby to cultivate one of a number of substantially parallel paths through the plants in a direction parallel to the path of travel of the support and including means to cause said cultivating means to shift transversely of the direction of its travel during its cultivating actions to avoid a particular plant disposed in any such path of travel of said cultivating means.

25. A cultivator comprising a support adapted to travel over the ground along a pre-selected path of travel and over plants to be cultivated, cultivating means shiftable on said support substantially transversely of such direction of travel, manually movable means on said support, adjustably shiftable in a direction transversely of the direction of travel of the support and thereafter movable substantially parallel to the direction of travel of the support in any one of said adjustably shifted positions, and mechanism actuated by the movement of said manually movable means for correspondingly shifting the cultivating means transversely of the direction of travel of the support to cause the cultivating means to cultivate any one of a number of paths parallel to the path of movement of said support and to shift laterally while travelling along said selected path to avoid a particular plant located in said path.

WILLIAM E. URSCHEL.